(12) United States Patent
Borman

(10) Patent No.: US 7,090,268 B2
(45) Date of Patent: Aug. 15, 2006

(54) DOG WASTE CATCHER AND HOLDER

(76) Inventor: Setsuko Borman, 12012 132nd St. East, Puyallup, WA (US) 98374

( * ) Notice: Subject to any disclaimer, the term of this patent is extended or adjusted under 35 U.S.C. 154(b) by 133 days.

(21) Appl. No.: 10/794,871

(22) Filed: Mar. 8, 2004

(65) Prior Publication Data

US 2004/0201232 A1 Oct. 14, 2004

Related U.S. Application Data

(60) Provisional application No. 60/462,192, filed on Apr. 14, 2003.

(51) Int. Cl.
 *A01K 29/00* (2006.01)

(52) U.S. Cl. ............................................... 294/1.5

(58) Field of Classification Search ................. 294/1.1, 294/1.3–1.5, 55; 248/99; 15/257.1
See application file for complete search history.

(56) References Cited

U.S. PATENT DOCUMENTS

| | | | | |
|---|---|---|---|---|
| 4,852,924 A | * | 8/1989 | Ines | 294/1.5 |
| 5,683,129 A | * | 11/1997 | Jensen | 294/1.5 |
| 5,718,469 A | * | 2/1998 | Ockerman | 294/1.4 |
| 5,779,290 A | * | 7/1998 | Wilke | 294/1.5 |
| 5,971,452 A | * | 10/1999 | Marymor et al. | 294/1.5 |
| 6,039,370 A | * | 3/2000 | Dooley et al. | 294/1.5 |
| 6,386,606 B1 | * | 5/2002 | Marshall | 294/1.5 |
| 6,485,073 B1 | * | 11/2002 | Harrison | 294/1.4 |
| 6,702,349 B1 | * | 3/2004 | Clements | 294/1.5 |

FOREIGN PATENT DOCUMENTS

| | | | | | |
|---|---|---|---|---|---|
| DE | 3807-7221 | * | 9/1989 | | 294/1.5 |
| FR | 2559-350 | * | 8/1985 | | 294/1.5 |

* cited by examiner

*Primary Examiner*—Dean J. Kramer
(74) *Attorney, Agent, or Firm*—Christensen O'Connor Johnson Kindness PLLC

(57) ABSTRACT

A dog waste catcher and holder is a very simple, lightweight and economical portable device designed to catch and hold a dog's droppings before they fall on the ground or grass. It is carried by a dog's owner or caretaker while he or she walks the dog. This is a device comprised of a loop shaped device to hold a plastic bag, a carrying rod of which one end is attached to the loop shaped device, a securing device such as a bracket to attach the loop shaped device to one end of the carrying rod, and a plastic bag, preferably a plastic bag such as a grocery bag, etc. placed inside the loop shaped device with its upper portion folded over the loop and its ends tied to the rod where the loop shaped device is attached. As soon as the dog shows the motion to excrete, this device can be placed under the dog's bottom and catches the waste in the plastic bag as it excretes. Once the dog has finished excreting, the plastic bag is removed and discarded. This is a very simple and sanitary way of catching and discarding the dog waste.

3 Claims, 1 Drawing Sheet

DOG WASTE CATCHER AND HOLDER

CROSS-REFERENCE TO RELATED APPLICATIONS

I am claiming the benefit of prior U.S. Provisional Application No. 60/462,192 filed on Apr. 14, 2003 by the applicant, Setsuko Borman, under the Title of Invention: dog waste catcher and holder.

BACKGROUND OF THE INVENTION

The present invention relates to a portable device which is very simple, economical, and easy to make and operate to catch and hold a dog's droppings excreted while walking the dog. It is carried by the dog's owner or caretaker while he or she takes the dog for a walk and is capable of collecting the dog's waste before it falls on the ground or grass. There is never any need to bend down to pick up the waste from the ground. Since it is the dog's owner or caretaker's responsibility to pick up the dog's waste in public places, this method of catching the dog waste is a very convenient and sanitary way of collecting the waste while walking the dog.

Dogs tend to excrete while they are walked. Once the droppings fall on the ground or grass, it is difficult to collect them completely, especially when they are loose. Even though "Dog waste receptacle and disposal device" in U.S. Pat. No. 6,164,710 addresses the concern, the invention does not address the simplicity, easiness and economical aspects of making and using the device. My invention is comprised of only a rod, a loop shaped device, a securing device to attach the loop shaped device to the rod, and a plastic bag, preferably a plastic bag such as a grocery bag, etc. It is very light in weight and easy to make and use. With my invention, you simply place a plastic bag inside the loop with its upper portion folded over the loop and its ends tied to the end of the rod, where the loop shaped device is attached. It is very economical, as my invention is designed with fewer parts without any complexity.

U.S. Pat. Application No. 20030005891 requires the dog's owner to place a collecting plastic sheet on the ground with the string attached to each corner before the dog excretes. Even though this method will catch the dog waste before it comes in contact with the ground, it requires the dog's owner to bend over and place the plastic sheet underneath the dog's bottom. If the dog moves from the original position, the dog's owner or caretaker must bend over again to reposition the sheet. Another disadvantage is that if it's windy, the plastic sheet can be easily blown away. However, with my invention, there is no need to bend over or worry that the plastic sheet will be blown away by the wind.

What is needed is a device that is simple, light-weight, economical, easy to make and use to catch the dog waste before it comes in contact with the ground or grass without having to bend over and repositioning a collecting device.

BRIEF SUMMARY OF THE INVENTION

The present invention provides a simple portable device which allows the dog's owner to catch and hold the dog waste in a plastic bag before it comes in contact with the ground or grass without bending over. This is a very simple device, comprised of a rod with one end used as a hand grip and the opposite end equipped with a loop shaped device to hold a plastic bag. Before taking the dog for a walk, a plastic bag, preferably a plastic bag such as a grocery bag etc. is placed inside the loop with its upper portion folded over the loop and its ends tied to the end of the rod where the loop shaped device is attached As soon as the dog shows a motion to excrete, this device is simply placed underneath the dog's bottom and catches the dog waste, thus preventing the soiling of the ground or grass. When the dog finished excreting, the plastic bag is simply untied from the rod, and the bag and its contents are discarded.

DETAILED DESCRIPTION OF THE INVENTION

The following description is provided to enable any person skilled in the art to make and use the invention.

Figure 1:
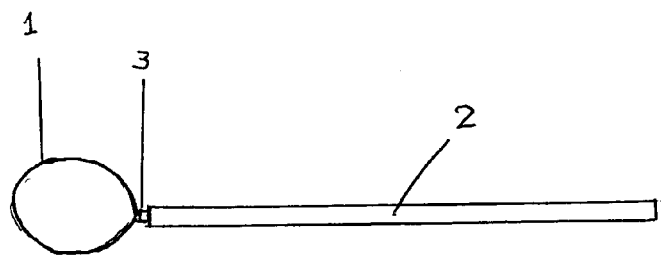
FIG. 1 is a side view of a dog waste catcher and holder without a plastic bag attached.
Figure 2:
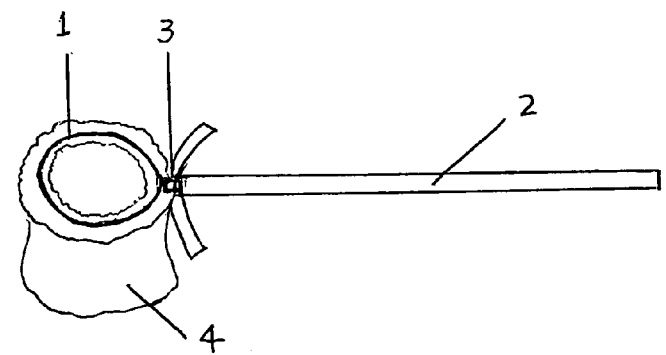
FIG. 2 is a side view similar to FIG. 1 showing a plastid bag attached to the loop shaped device.

Referring to the drawings, a dog waste catcher and holder as shown in FIG. 1 and FIG. 2, includes a loop shaped device 1 made of such material as wire, plastic, or metal, etc., that has the enough strength to hold the dog waste in a plastic bag, a holding rod 2 made of such material as bamboo, wood, plastic, or metal, etc., and whose end is attached to the loop shaped device by a securing device 3, and a plastic bag 4, preferably a plastic bag such as a grocery bag, etc. placed inside the loop and its upper portion folded over the loop and its ends tied to the rod where the loop shaped device is attached. The securing device 3 may be bracket, metal, wire, silicone, string, tape, cord, or any kind of adhesives. In some embodiments, the holding rod 2 may be telescopic so that its length can be adjusted.

Figure 3:
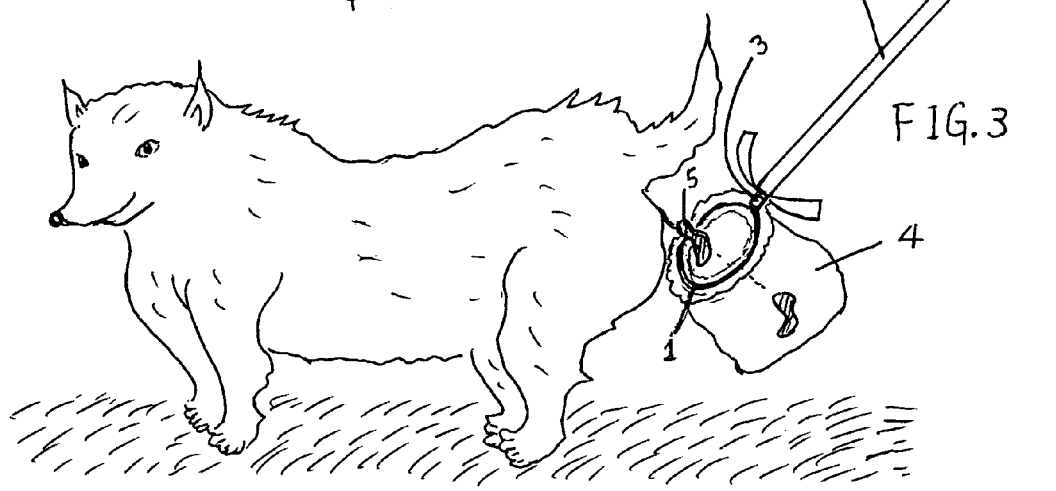
FIG. 3 is a schematic view showing the dog waste catcher and holder in operation.

A method for using the dog waste catcher and holder of this invention is as follows: First, a plastic bag 4 in FIG. 2, preferably a plastic bag such as a grocery bag, etc. is placed inside the loop 1 with its upper portion folded over the loop and its ends tied to the end of the rod 2 where the loop shaped device is attached. This plastic bag is for catching the dog droppings as it excretes and holding them inside. The dog owner or care taker will carry the device by holding the rod with a plastic bag attached. As soon as the dog is ready to excrete, the device is placed under the dog's bottom and catches the droppings 5 in FIG. 3. When the dog finished excreting, the plastic bag is untied from the rod and the bag and its contents are disposed.

What I claim as my invention is:

1. A dog waste catcher and holder comprising:
   a loop shaped device;
   a carrying rod;
   means of securing the loop shaped device to an end of the carrying rod in parallel fashion; and
   a plastic bag placed inside the loop shaped device, wherein an upper portion of the bag is folded over the loop shaped device and bag ends are tied to the end of the rod.

2. A dog waste catcher and holder of claim 1, wherein said loop shaped device is made of any material selected from a group consisting of wire, plastic, and metal.

3. A dog waste catcher and holder of claim 1, wherein said carrying rod is made of any material selected from a group consisting of bamboo, wood, plastic, and metal.

* * * * *

UNITED STATES PATENT AND TRADEMARK OFFICE
CERTIFICATE OF CORRECTION

PATENT NO. : 7,090,268 B2  Page 1 of 1
APPLICATION NO. : 10/794871
DATED : August 15, 2006
INVENTOR(S) : S. Borman It is certified that error appears in the above-identified patent and that said Letters Patent is hereby corrected as shown below:

| COLUMN | LINE | ERROR |
|---|---|---|
| Title page, item (56) Pg. 1, col. 2 | Refs. Cited (U.S. Pats., Item 8) | "6,485,073 B1" should read --6,485,073 B2-- |
| Title page, item (56) Pg. 1, col. 2 | Refs. Cited (U.S. Pats., Item 9) | "6,702,349 B1" should read --6,702,349 B2-- |
| Title page, item (56) Pg. 1, col. 2 | Refs. Cited (Foreign Pats., Item 1) | "3807-7221" should read --3807-221-- |

Signed and Sealed this

Twelfth Day of December, 2006

JON W. DUDAS
*Director of the United States Patent and Trademark Office*